No. 756,329. PATENTED APR. 5, 1904.
W. C. CLARKE.
HEAT TRANSMITTING DEVICE.
APPLICATION FILED JAN. 30, 1903.
NO MODEL. 2 SHEETS—SHEET 1.

WITNESSES: INVENTOR
William C. Clarke
BY
Clarkson A. Collins
ATTORNEY

No. 756,329. PATENTED APR. 5, 1904.
W. C. CLARKE.
HEAT TRANSMITTING DEVICE.
APPLICATION FILED JAN. 30, 1903.
NO MODEL. 2 SHEETS—SHEET 2.

WITNESSES:
Geo W Eisenbraun
S. F. Randall

INVENTOR
William C. Clarke
BY
Clarkson A. Collins
ATTORNEY

No. 756,329. Patented April 5, 1904.

UNITED STATES PATENT OFFICE.

WILLIAM C. CLARKE, OF NEW YORK, N. Y., ASSIGNOR TO GILBERT & BARKER MANUFACTURING COMPANY, OF SPRINGFIELD, MASSACHUSETTS, A CORPORATION OF MASSACHUSETTS.

HEAT-TRANSMITTING DEVICE.

SPECIFICATION forming part of Letters Patent No. 756,329, dated April 5, 1904.

Application filed January 30, 1903. Serial No. 141,095. (No model.)

*To all whom it may concern:*

Be it known that I, WILLIAM C. CLARKE, a citizen of the United States, residing in the city of New York, in the county and State of New York, have invented certain new and useful Improvements in Heat-Transmitting Devices, of which the following is a specification.

My invention relates to that class of heat-transmitting devices in which a fluid to be heated receives its heat from a heated fluid in operative contact therewith—such, for example, as the well-known devices for heating water by gas-flames; and the object of my improvements is to increase the percentage of applied heat absorbed by the fluid to be heated. To this end I provide a flue through which passes the heating fluid, which may be hot air from a gas-flame or other fluid used to transmit the heat. Through this flue passes a pipe or channel for the fluid to be heated, which is so shaped and proportioned as to form within the flue a hollow body, (through the walls of which flows the fluid to be heated,) which completely obstructs the direct path of the heating fluid through the flue and compels it to pass through narrow openings provided for the purpose into the interior of said hollow body and thence through similar openings into the part of the flue exterior thereto. In this manner I prevent any of the heating fluid from passing through the flue without coming in contact with the channel containing the fluid to be heated, and a greater proportion of the applied heat is absorbed by the fluid to be heated than has heretofore been possible.

My invention will be best understood by reference to the accompanying drawings, which illustrate a form of apparatus in which it is embodied.

Figure 1:
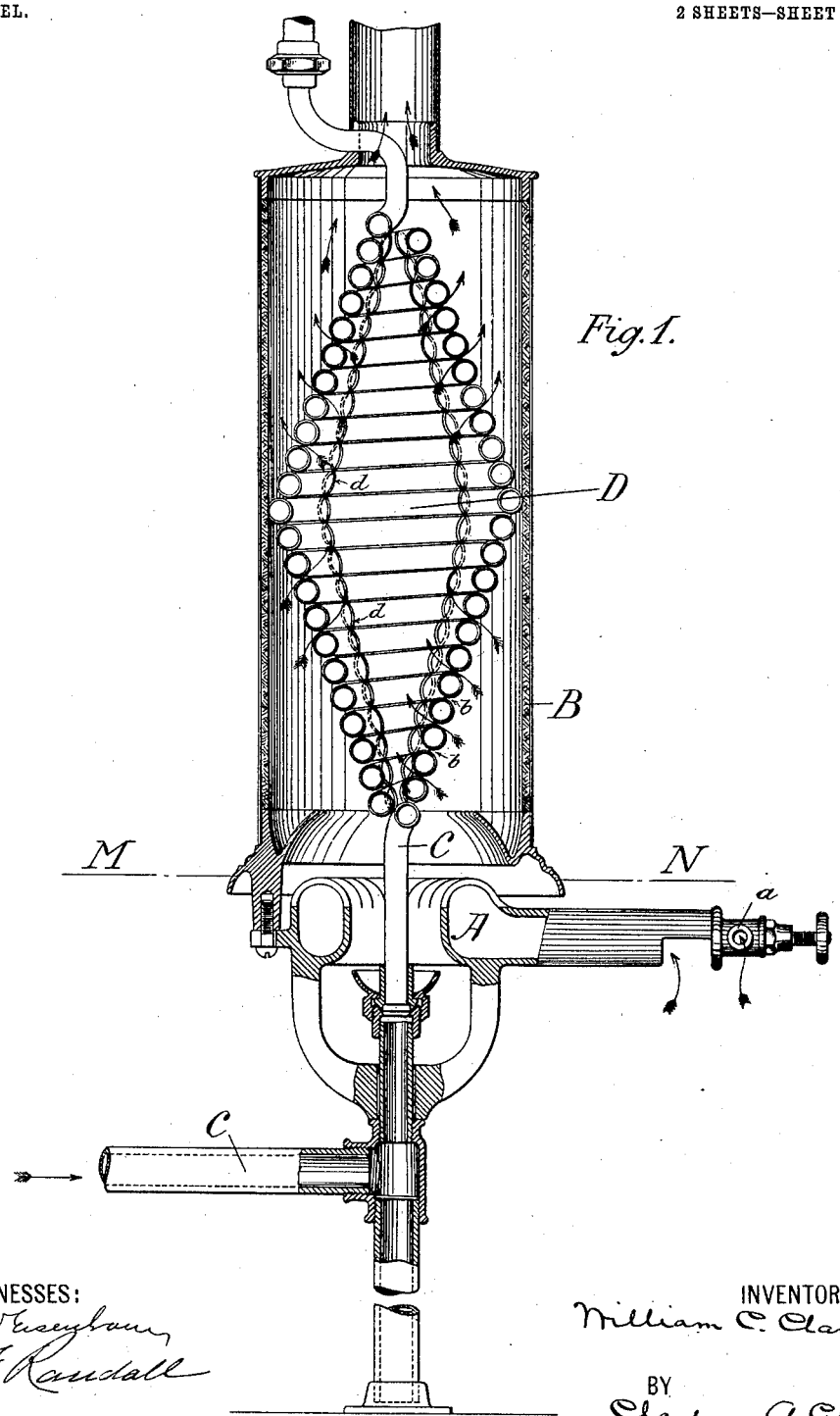
Figure 4:
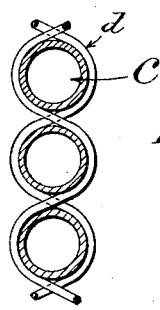
Figure 2:
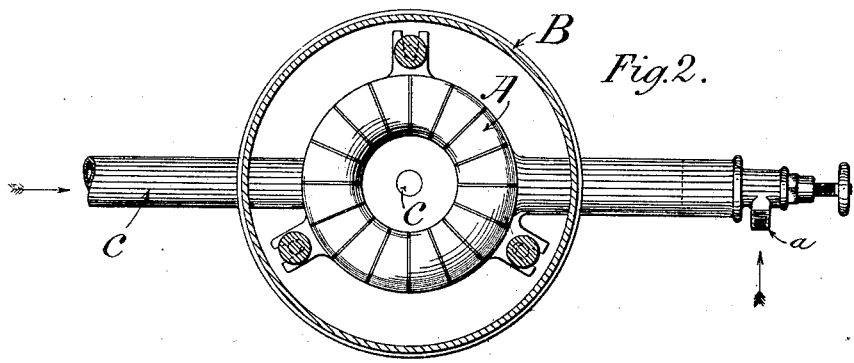
Figure 3:
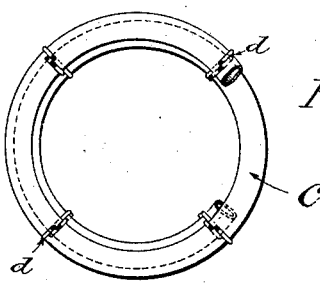

Figure 1 shows a vertical section of the apparatus. Fig. 2 shows a horizontal section on the line M N, Fig. 1. Fig. 3 is a cross-section of the hollow body formed by the pipe carrying the fluid to be heated at the largest part thereof, and Fig. 4 is an enlarged view of certain details.

The same letters of reference indicate corresponding parts throughout.

Referring to the drawings, A indicates an ordinary form of gas-burner, and B a flue located above the burner for the passage of air heated by the gas-flame. Through the flue B passes the pipe C, which is coiled so as to form within the flue B a hollow body D, the central part of which is of such diameter as to completely close the flue B, while its ends taper to a point.

The separate coils forming the wall of the hollow body D are slightly separated, so as to leave narrow interstices $b\,b$, &c., between them which provide opening between the part of the flue B exterior to the body D and the interior thereof. These interstices may be kept open and the convolutions of the coil held in place under changes of temperature by means of suitable spacing devices, consisting in this instance of a wire $d$, interwoven between the convolutions of the coil or in any other suitable manner.

When the gas at the burner A is ignited, the air heated thereby passes upward through the flue B and is compelled to pass through the interstices between the coils in the lower part of the hollow body D into the interior thereof and thence through the interstices in the upper part of the hollow body D back into the part of the flue exterior thereto, as indicated by the arrows. Thus no part of the stream of hot air is able to pass through the flue B without impinging upon the coils of the pipe C, while at the same time an extended surface for the absorption of heat is presented, so that a very great percentage of the applied heat is absorbed by the fluid passing through the pipe C.

Other sources of heat than gas-flames and other heat-transmitting fluids than hot air may be employed without departing from the spirit of my invention, and I do not wish to be understood as limiting my invention to the use of any specific source of heat or heat-transmitting fluid nor to the particular form of apparatus illustrated herein, various modifications of which will readily occur to those skilled in the art.

What I do claim as new, and desire to secure by Letters Patent, is—

In a heat-transmitting device, the combination with a vertical cylindrical flue, of substantially uniform diameter throughout its length, for the passage of a heating medium, of a coil for a fluid to be heated located therein and having its greatest length vertically, said coil having its convolution of greatest diameter located centrally of its vertical length and directly engaging the inner face of the flue, the convolutions above and below said central convolution decreasing gradually in diameter and being separated slightly one from another, leaving the space within the flue entirely unobstructed and a continuous spacing-wire interwoven between the convolutions of the coil from one end of the same to the other to hold said convolutions from closing the spaces between them, substantially as described.

In testimony whereof I have hereunto subscribed my name this 27th day of January, A. D. 1903.

WM. C. CLARKE.

Witnesses:
MAX W. HECKMAN,
GEORGE COSTER.